(12) United States Patent
Baba (10) Patent No.: US 11,994,977 B2
(45) Date of Patent: May 28, 2024

(54) TEST CASE GENERATION APPARATUS, TEST CASE GENERATION METHOD, AND COMPUTER READABLE MEDIUM

(71) Applicant: Mitsubishi Electric Corporation, Tokyo (JP)

(72) Inventor: Madoka Baba, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 342 days.

(21) Appl. No.: 17/394,743

(22) Filed: Aug. 5, 2021

(65) Prior Publication Data
US 2021/0365355 A1 Nov. 25, 2021

Related U.S. Application Data

(63) Continuation of application No. PCT/JP2019/012548, filed on Mar. 25, 2019.

(51) Int. Cl.
*G06F 9/44* (2018.01)
*G06F 11/36* (2006.01)

(52) U.S. Cl.
CPC ...... *G06F 11/3684* (2013.01); *G06F 11/3688* (2013.01); *G06F 11/3692* (2013.01)

(58) Field of Classification Search
None
See application file for complete search history.

(56) References Cited

U.S. PATENT DOCUMENTS

| 5,831,998 A * | 11/1998 | Ozmizrak | G06F 11/3676 |
|---|---|---|---|
| | | | 714/741 |
| 2006/0070048 A1* | 3/2006 | Li | G06F 11/3676 |
| | | | 717/144 |
| 2008/0141084 A1* | 6/2008 | Bohizic | G06F 11/3684 |
| | | | 714/724 |
| 2012/0221283 A1* | 8/2012 | Lee | G06F 11/3676 |
| | | | 702/119 |

(Continued)

FOREIGN PATENT DOCUMENTS

| CN | 102135939 A | 7/2011 |
| JP | 2011-8628 A | 1/2011 |

(Continued)

OTHER PUBLICATIONS

International Search Report for PCT/JP2019/012548 dated Jun. 25, 2019.

(Continued)

*Primary Examiner* — Qamrun Nahar
(74) *Attorney, Agent, or Firm* — Birch, Stewart, Kolasch & Birch, LLP (57) ABSTRACT

If an (i−1)-th test case which is a test case for step 1 to step (i−1) is stored, a generation control unit (130) selects a first generation scheme (M1) which uses the (i−1)-th test case to generate an i-th test case which is a test case for step 1 to step i. A test generation unit (170) generates a test case for executing an i-th step in a state where an internal state at an end of the (i−1) steps caused by execution for the (i−1)-th test case is retained, in accordance with the first generation scheme (M1). The test generation unit (170) generates the i-th test case by joining the (i−1)-th test case and the test case for the i-th step.

10 Claims, 9 Drawing Sheets

(56) References Cited

U.S. PATENT DOCUMENTS

| | | |
|---|---|---|
| 2014/0053134 A1 | 2/2014 | Wiggers et al. |
| 2016/0259943 A1 | 9/2016 | Murthy et al. |
| 2019/0018765 A1* | 1/2019 | Isoda ................ G06F 11/3676 |

FOREIGN PATENT DOCUMENTS

| | | |
|---|---|---|
| JP | 2014-63415 A | 4/2014 |
| JP | 2016-9344 A | 1/2016 |
| JP | 2016-167262 A | 9/2016 |
| JP | 2016-206727 A | 12/2016 |
| JP | 2017-204164 A | 11/2017 |
| WO | WO 2016/170937 A1 | 10/2016 |

OTHER PUBLICATIONS

Chinese Office Action and Search Report for Chinese Application No. 201980094049.9, dated Oct. 9, 2023, with English translation.

* cited by examiner

```
                                     20
                       PROGRAM
  int mode = 0;
  int sub_mode = 0;
  int cnt = 0;

void func(void){
    static int preA = 0;

cnt++;
    if(mode == 0){ mode = 1;
      sub_mode = 1;
    }else{
      if(sub_mode1 == 1){
        if(sigA > 10){ sub_mode = 2;
        }

}
      else if(sub_mode == 2 && sigA > 30){

···(OMITTED)···
      }

} if(cnt>1 && preA > 100){

···(OMITTED)···
    }

···(OMITTED)···
    preA = sigA;
  }
```

Fig. 6

```
                    ┌─ 20
                    PROGRAM
    int mode = 0;
    int sub_mode = 0;
    int cnt = 0;

void func(void){
      static int preA = 0;

cnt++;
      if(mode == 0){
        // P1
        mode = 1;
        sub_mode = 1;
      }else{
        if(sub_mode1 == 1){
          if(sigA > 10){
            // P2
            sub_mode = 2;
          }
          else{ // P3 }
        }
        else if(sub_mode == 2 && sigA > 30){
          // P4
          ···(OMITTED)···
        }
        else{ // P5 }
      } if(cnt>1 && preA > 100){
        // P6
        ···(OMITTED)···
      }
      else{ // P7 }
      ···(OMITTED)···
      preA = sigA;
    }
```

21 . COVERABLE POINT

Fig. 7

TEST CASE GENERATION FUNCTION

```
void wrap(){
  sigA = sigA_1;

func(void);      /* FIRST STEP */

ASSERT(CONDITION FOR GENERATING sigA_1 WHICH ALLOWS PASSAGE THROUGH P2);
  ASSERT(CONDITION FOR GENERATING sigA_1 WHICH ALLOWS PASSAGE THROUGH P3);
  ASSERT(CONDITION FOR GENERATING sigA_1 WHICH ALLOWS PASSAGE THROUGH P4);
  ASSERT(CONDITION FOR GENERATING sigA_1 WHICH ALLOWS PASSAGE THROUGH P5);
  ASSERT(CONDITION FOR GENERATING sigA_1 WHICH ALLOWS PASSAGE THROUGH P6);
}
```

Fig. 8

TEST CASE GENERATION FUNCTION

```
void wrap(){ sigA = 50 ,
  func(void);      /* FIRST STEP */ sigA = sigA_2 ;
  func(void);      /* SECOND STEP */

ASSERT(CONDITION FOR GENERATING sigA_2 WHICH ALLOWS PASSAGE THROUGH P3);
  ASSERT(CONDITION FOR GENERATING sigA_2 WHICH ALLOWS PASSAGE THROUGH P4);
  ASSERT(CONDITION FOR GENERATING sigA_2 WHICH ALLOWS PASSAGE THROUGH P5);
  ASSERT(CONDITION FOR GENERATING sigA_2 WHICH ALLOWS PASSAGE THROUGH P6);
}
```

Fig. 9

TEST CASE GENERATION FUNCTION — 22

```
void wrap(){ sigA = sigA_1 ;
  func(void);      /* FIRST STEP */ sigA = sigA_2 ;
  func(void);      /* SECOND STEP */

ASSERT(CONDITION FOR GENERATING sigA_1 AND sigA_2 WHICH ALLOW PASSAGE THROUGH P4);
  ASSERT(CONDITION FOR GENERATING sigA_1 AND sigA_2 WHICH ALLOW PASSAGE THROUGH P5);
  ASSERT(CONDITION FOR GENERATING sigA_1 AND sigA_2 WHICH ALLOW PASSAGE THROUGH P6);
}
```

Fig. 10

TEST CASE GENERATION FUNCTION — 22

```
void wrap(){ sigA = 50 ;
  func(void);      /* FIRST STEP */ sigA = 50 ;
  func(void);      /* SECOND STEP */ sigA = sigA_3 ,
  func(void);      /* THIRD STEP */

ASSERT(CONDITION FOR GENERATING sigA_3 WHICH ALLOWS PASSAGE THROUGH P5);
}
```

Fig. 11

TEST CASE GENERATION APPARATUS, TEST CASE GENERATION METHOD, AND COMPUTER READABLE MEDIUM

CROSS REFERENCE TO RELATED APPLICATION

This application is a Continuation of PCT International Application No. PCT/JP2019/012548, filed on Mar. 25, 2019, which is hereby expressly incorporated by reference into the present application.

TECHNICAL FIELD

The present invention relates to a test case generation apparatus, a test case generation method, and a test case generation program, and particularly to a test case generation apparatus, a test case generation method, and a test case generation program which automatically generates a test case for embedded software.

BACKGROUND ART

Pieces of embedded real-time software for various control are installed on pieces of control equipment, such as an automobile and an industrial robot. A malfunction of such software leads to an accident fatal to humans. For this reason, thorough testing needs to be conducted before shipping. For example, ISO 26262 that is a functional safety standard for automobiles and DO-178C that is a functional safety standard for aircraft each define a test requirement, such as a test scheme to be adopted, for each test step and require that a test is conducted in accordance with the test requirements. A test is executed so as to cover requirements by creating a test case on the basis of equivalence partitioning or boundary-value analysis as an example of a test requirement of a unit test. The test case is simultaneously required to cover a structure of source code of software under test. In the structure of the source code, lines of code describing processes or branch points, such as an if statement and a for statement, are used as a criterion. Criteria to be used differ by software under test. Such criteria are called structure coverage criteria. In a case using lines of code as a structure coverage criterion, statement coverage indicating how much of code included in software under test is executed with a test case is measured. In a case using branches, such as an if statement, as the structure coverage criterion, branch coverage indicating whether all branch destinations included in the code are executed is measured. If the statement coverage or the branch coverage is sufficiently high, the case is determined as sufficient for testing.

Embedded real-time software commonly has a plurality of states, such as an initial state, an execution state, and a state of preparing to end. As for this software, a structure of source code cannot be covered by inputting a test case for only one time. Inputting a test case for a plurality of times may be needed. Here, an executable unit for software under test is called a step. For example, inputting a test case once corresponds to one step.

Source codes of pieces of embedded real-time software have been increasing in size and complexity in recent years. For this reason, an increase in the number of man-hours for manually creating a test case spanning a plurality of steps which covers a structure of source code while meeting a software requirements specification has become a problem.

Patent Literature 1 discloses a method for using bounded model checking to automatically generate a test case for a plurality of steps for a unit test in order to cope with an increase in the number of man-hours.

Patent Literature 2 discloses a method using non-symbolic execution, such as white box fuzzing, in addition to a method using symbolic execution in order to generate an input value for vulnerability analysis.

Patent Literature 3 discloses a method which performs path analysis based on symbolic execution for each module and then uses pieces of information on the modules to obtain composite execution paths of a plurality of modules.

CITATION LIST

Patent Literature

Patent Literature 1: JP 2014-063415 A
Patent Literature 2: JP 2016-167262 A
Patent Literature 3: JP 2017-204164 A

SUMMARY OF INVENTION

Technical Problem

In the method according to Patent Literature 1, bounded model checking is used to perform, in order, first-time and subsequent analyses of whether a test case meeting a test requirement can be generated, until a maximum step number set in advance is reached. If there is any uncovered requirement or branch, the number of steps is incremented, and analysis for test case generation is repeated. Since an increase in the number of steps increases the number of states subject to bounded model checking, this method suffers from the following problem: a test case generation time period may fall outside a practical time period.

The method according to Patent Literature 2 combines both test case generation based on symbolic execution, such as bounded model checking, and test case generation based on non-symbolic execution, such as white box fuzzing. It is thus possible to reduce an entire test case generation time period by using a high-speed generation method based on non-symbolic execution to cover as many objects to be covered as possible and using a reliable generation method based on symbolic execution to cover the remaining objects to be covered. However, if the number of steps increases, since analysis and generation are performed corresponding to the number of steps, the challenge of an increase in a test case generation time period with an increase in the number of steps remains.

The method according to Patent Literature 3 shortens a time period to extract execution paths spanning all steps at the time of test case generation by extracting an execution path for each step and then linking information on a variable which is saved across steps. However, since the size of an execution path serving as an object to be analyzed for test case generation increases by an amount corresponding to the number of steps, a test case generation time period may fall outside a practical time period, as in the other methods.

As described above, the conventional methods cannot be applied to generation of a test case spanning a plurality of steps which is intended for software, such as embedded real-time software, in which inputs vary between steps.

The present invention has as its object to reduce a time period taken to generate a test case spanning a plurality of steps.

Solution to Problem

A test case generation apparatus according to the present invention generates a test case, the test case being input to a program which executes a process for one step each time a value is input and being composed of a test case input number of values which are input to respective processes for i (i is an integer equal to or more than 2) steps to be sequentially executed, the test case generation apparatus comprising:

a memory to store data;

a generation control unit to, if an (i−1)-th test case which is a test case for step 1 to step (i−1) is stored in the memory, select a first generation scheme which uses the (i−1)-th test case to generate an i-th test case which is a test case for step 1 to step i; and a test generation unit to generate a test case for executing an i-th step in a state where an internal state at an end of the (i−1) steps caused by execution for the (i−1)-th test case is retained, to generate the i-th test case by joining the (i−1)-th test case and the test case for the i-th step, and to store the i-th test case in the memory, in accordance with the first generation scheme.

Advantageous Effects of Invention

The test case generation apparatus according to the present invention executes only test case generation based on non-symbolic execution or symbolic execution for one step even if the number of steps is incremented. It is thus possible to reduce a time period taken for test case generation based on non-symbolic execution or symbolic execution spanning a plurality of steps.

DESCRIPTION OF EMBODIMENTS

An embodiment of the present invention will be described below with reference to the drawings. Note that identical or corresponding portions in the drawings are denoted by identical reference characters. A description of an identical or corresponding portion will be appropriately omitted or simplified in the description of the embodiment.

Embodiment 1

* Description of Configuration *

Figure 1:
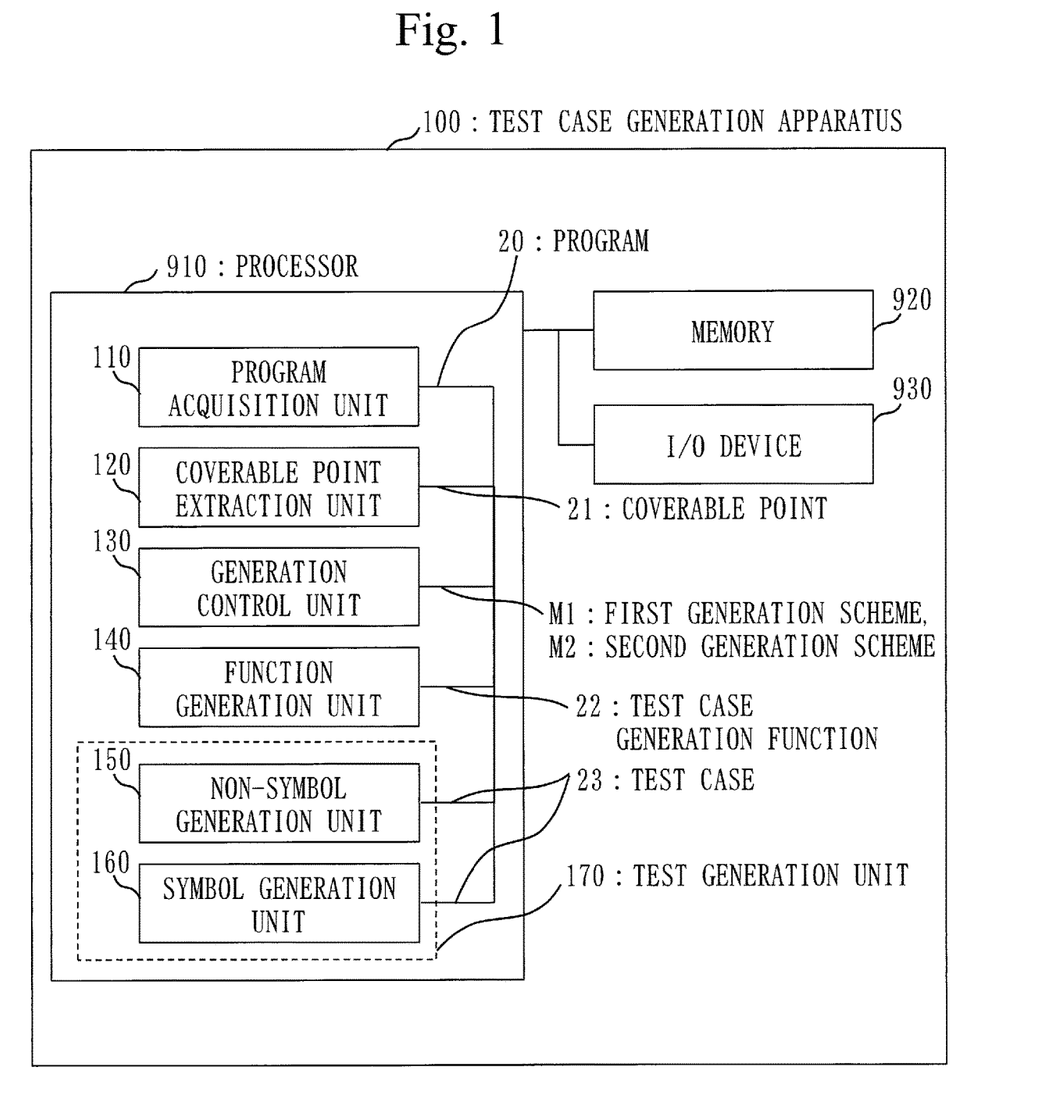
FIG. 1 is a block diagram illustrating a configuration of a test case generation apparatus according to Embodiment 1.

A configuration of a test case generation apparatus 100 according to the present embodiment will be described with reference to FIG. 1.

The test case generation apparatus 100 is a computer. The test case generation apparatus 100 includes a processor 910 and also includes other pieces of hardware, such as a memory 920 and an I/O device 930. The processor 910 is connected to the other pieces of hardware via signal lines and controls the other pieces of hardware.

The test case generation apparatus 100 includes, as functional elements, a program acquisition unit 110, a coverable point extraction unit 120, a generation control unit 130, a function generation unit 140, a non-symbol generation unit 150, and a symbol generation unit 160. Note that the non-symbol generation unit 150 and the symbol generation unit 160 are also referred to as a test generation unit 170. The functional elements are implemented by software.

The processor 910 is a device which executes a test case generation program. The test case generation program is a program which implements capabilities of the program acquisition unit 110, the coverable point extraction unit 120, the generation control unit 130, the function generation unit 140, the non-symbol generation unit 150, and the symbol generation unit 160. The processor 910 is, for example, a CPU. "CPU" stands for Central Processing Unit.

The memory 920 is a device which stores the test case generation program. The memory 920 is, for example, a RAM, a flash memory, or a combination thereof. "RAM" stands for Random Access Memory. A program of software under test, specification information of the software under test, and information, such as a generated test case, are also stored in the memory 920.

The I/O device 930 is connected to input equipment which is manipulated by a user to input data to the test case generation program and a display which displays data output from the test case generation program on a screen. The input equipment is, for example, a mouse, a keyboard, a touch panel, or a combination of some or all thereof. The display is, for example, an LCD. "LCD" stands for Liquid Crystal Display. The display is used especially to display a test case generated by the test generation unit 170.

The test case generation program is read from the memory 920 into the processor 910 and is executed by the processor 910. Not only the test case generation program but also an OS is stored in the memory 920. "OS" stands for Operating System. The processor 910 executes the test case generation program while executing the OS. Note that a part or the whole of the test case generation program may be incorporated in the OS.

The test case generation program and the OS may be stored in an auxiliary storage device. The auxiliary storage device is, for example, an HDD, a flash memory, or a combination thereof "HDD" stands for Hard Disk Drive. If the test case generation program and the OS are stored in the auxiliary storage device, the test case generation program and the OS are loaded into the memory 920 and are executed by the processor 910.

The test case generation apparatus 100 may include a plurality of processors 910 which substitute for the processor 910. The plurality of processors 910 share execution of the test case generation program. Each processor 910 is, for example, a CPU.

Data, information, a signal value, and a variable value to be used, processed, or output by the test case generation program are stored in the memory 920, the auxiliary storage device, or a register or a cache memory in the processor 910.

The term "unit" in each of the program acquisition unit 110, the coverable point extraction unit 120, the generation control unit 130, the function generation unit 140, the non-symbol generation unit 150, the symbol generation unit 160, and the test generation unit 170 may be replaced with the term "process", "procedure", or "step". The term "process" in each of a program acquisition process, a coverable point extraction process, a generation control process, a function generation process, a non-symbol generation process, a symbol generation process, and a test generation process may be replaced with the term "program", "program product", or "computer-readable recording medium having a program recorded thereon".

The test case generation program causes a computer to execute processes, procedures, or steps which are obtained by replacing the term "unit" in each of the above-described units with the term "process", "procedure", or "step". A test case generation method is a method which is performed when the test case generation apparatus 100 executes the test case generation program.

The test case generation program may be stored in a computer-readable recording medium and be provided. The test case generation program may be provided as a program product.

The test case generation apparatus 100 may be composed of one computer or be composed of a plurality of computers. If the test case generation apparatus 100 is composed of a plurality of computers, the capabilities of the program acquisition unit 110, the coverable point extraction unit 120, the generation control unit 130, the function generation unit 140, the non-symbol generation unit 150, and the symbol generation unit 160 may be distributed to the computers and be implemented.

* Description of Capabilities *

An overview of operation of the test case generation apparatus 100 according to the present embodiment will be described with reference to FIG. 1. The operation of the test case generation apparatus 100 corresponds to a test case generation method according to the present embodiment.

The test case generation apparatus 100 generates a test case 23 to be input to a program 20 which executes a process for one step each time a value is input thereto. The test case 23 is composed of a test case input number of values which are input to respective processes for i (i is an integer equal to or more than 2) steps to be sequentially executed. Note that the present embodiment can also be applied to a case where a test case is for only one step (that is, i=1).

The program acquisition unit 110 reads the program 20 of the software under test, the specification information, and information on a maximum step number from outside via the memory 920 or the I/O device 930.

The coverable point extraction unit 120 extracts coverable points 21 which are to be covered by a test from source code of the program 20.

The generation control unit 130 judges whether an (i−1)-th test case which is a test case for step 1 to step (i−1) is stored in the memory 920. If the (i−1)-th test case is stored, the generation control unit 130 selects a first generation scheme M1 for using the (i−1)-th test case to generate an i-th test case which is a test case for step 1 to step i. If the (i−1)-th test case is not stored in the memory 920, the generation control unit 130 selects a second generation scheme M2 for generating respective test cases for step 1 to step i.

As described above, the generation control unit 130 controls a test case generation procedure for identifying a step subject to test case generation and selecting a test case generation scheme for the step.

The function generation unit 140 generates a test case generation function 22 which calls a program of software under test while retaining a state between steps in accordance with the test case generation scheme determined by the generation control unit 130. The function generation unit 140 is also referred to as a test case generation function generation unit. The function generation unit 140 generates the test case generation function 22 that includes a test case generation condition and a call to the program such that the i-th test case covers an uncovered point which is a coverable point not covered by first to (i−1)-th test cases.

The function generation unit 140 generates the test case generation function 22 that uses the (i−1)-th test case to generate the i-th test case that is a test case for step 1 to step i, in accordance with the first generation scheme M1.

The function generation unit 140 generates the test case generation function 22 that generates respective test cases for a first step to an i-th step in a state where an internal state at the end of the (i−1) steps caused by execution for the (i−1)-th test case is retained, in accordance with the second generation scheme M2.

In the description here, "test case for the i steps" or "test case generated from the i steps" refers to test case input values for the i steps from step 1 to step i. The test case input values for the i steps from step 1 to step i are also referred to as the i-th test case. Similarly, test case input values for step 1 to step (i−1) are also referred to as the (i−1)-th test case.

"Test case for the i-th step" refers to a test case input value for one step intended for step i.

The test generation unit 170 generates a test case for executing the i-th step in a state where the internal state at the end of the (i−1) steps caused by execution for the (i−1)-th test case is retained, in accordance with the first generation scheme M1. The test generation unit 170 then generates the i-th test case by joining the (i−1)-th test case and the test case for the i-th step and stores the i-th test case in the memory 920. Alternatively, the test generation unit 170 uses the test case generation function to generate respective test cases for the first step to the i-th step, in accordance with the second generation scheme M2. The test generation unit 170 then generates the i-th test case by joining the test cases for the first step to the i-th step and stores the i-th test case in the memory 920. As described above, the test generation unit 170 uses the test case generation function 22 to generate the i-th test case.

The test generation unit 170 includes the non-symbol generation unit 150 that generates a test case by non-symbolic execution and the symbol generation unit that generates a test case by symbolic execution. The test generation unit 170 generates the i-th test case with the non-symbol generation unit 150 when the first generation scheme M1 is selected. The test generation unit 170 then judges, through execution of a test using the i-th test case generated by the non-symbol generation unit 150, whether there is any uncovered point. If there is any uncovered point, the test generation unit 170 generates the i-th test case with the symbol generation unit 160 such that at least any of uncovered points is covered. The test generation unit 170 then stores the i-th test case generated by the symbol generation unit 160 in the memory 920. If the test generation unit 170 uses the (i−1)-th test case to generate the i-th test case, in accordance with the first generation scheme M1, the test generation unit 170 abandons the used (i−1)-th test case.

The non-symbol generation unit 150 randomly generates an input value which serves as a test case candidate in accordance with the specification information read by the program acquisition unit 110. The function generation unit 140 uses a generated function to extract an input which covers an object to be covered while retaining a state between steps, and determines the input as a test case. The non-symbol generation unit 150 is also referred to as a test generation unit based on non-symbolic execution. The symbol generation unit 160 uses a function generated by the function generation unit 140 to generate a test case by a bounded model checking scheme while retaining a state between steps, in accordance with the specification information read by the program acquisition unit 110. The symbol generation unit 160 is also referred to as a test generation unit based on symbolic execution.

* Description of Operation *

Figure 2:
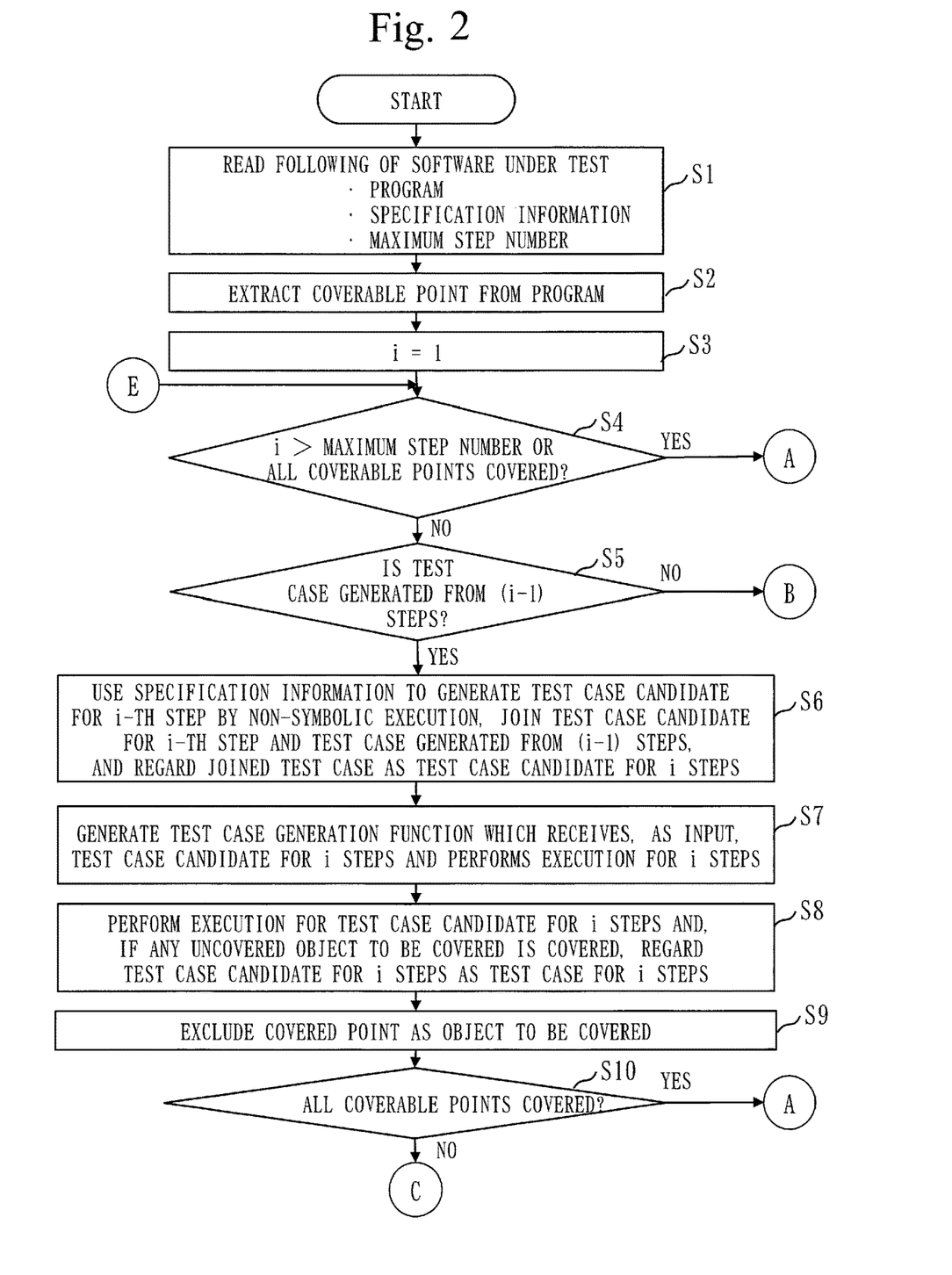
FIG. 2 is a flowchart illustrating operation of the test case generation apparatus according to Embodiment 1.
Figure 3:
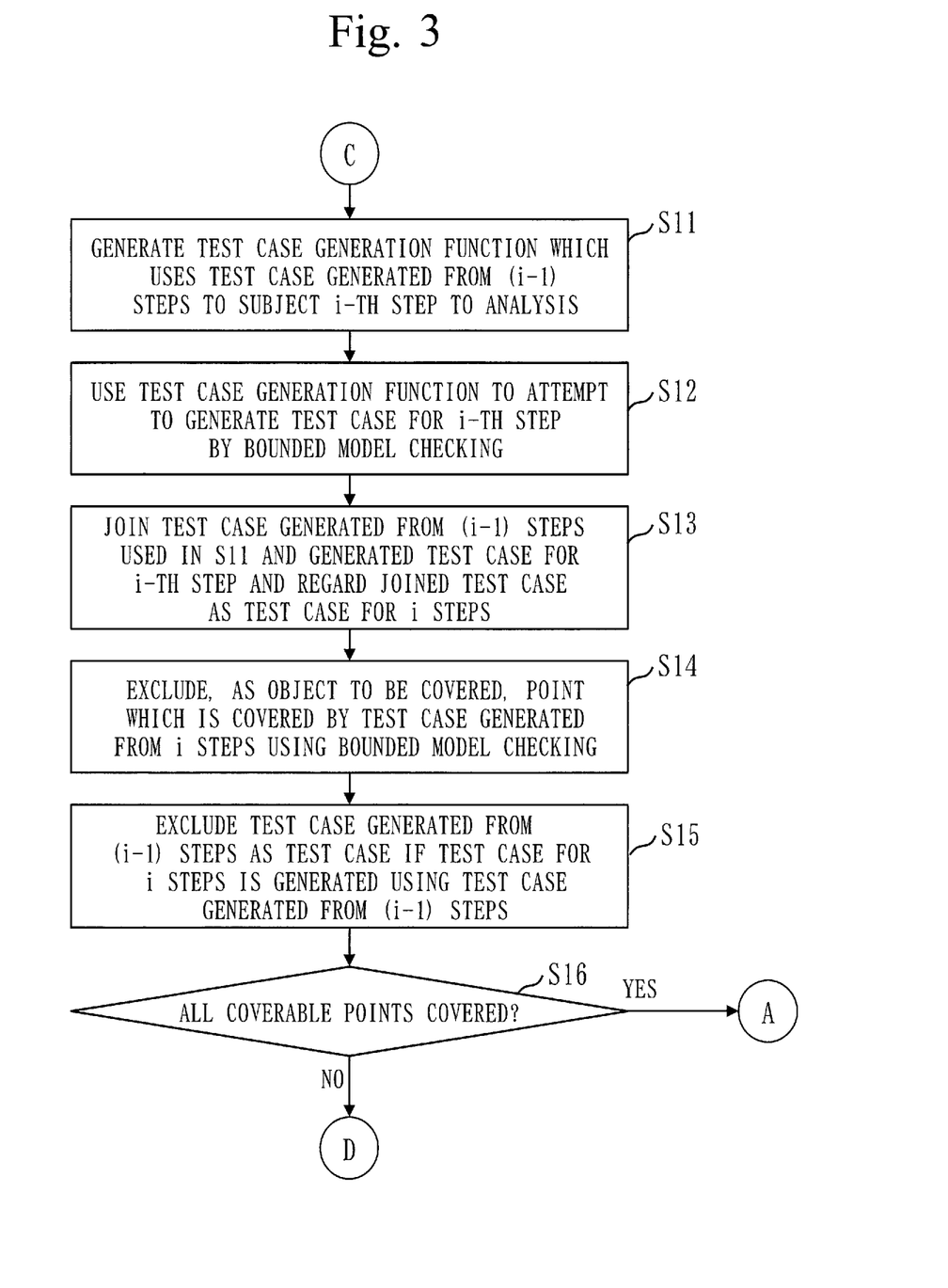
FIG. 3 is a flowchart illustrating the operation of the test case generation apparatus according to Embodiment 1.
Figure 4:
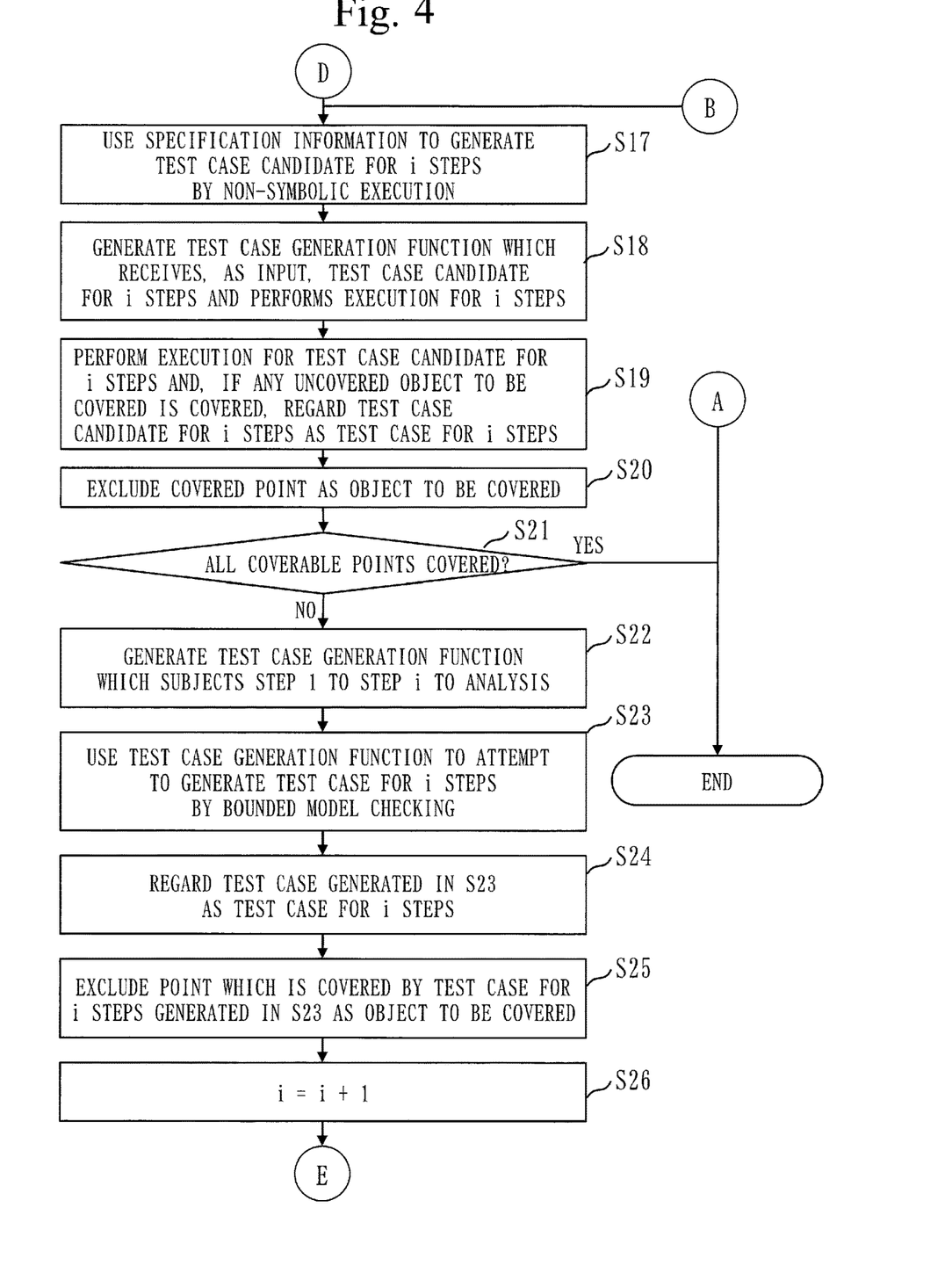
FIG. 4 is a flowchart illustrating the operation of the test case generation apparatus according to Embodiment 1.

Details of the operation of the test case generation apparatus 100 according to the present embodiment will next be described with reference to FIGS. 2 to 4.

In step S1, the program acquisition unit 110 reads the program 20 of the software under test, the specification information, and the information on the maximum step number. The process then advances to step S2. The specification information and the maximum step number can be manually set on the basis of software specifications by a user. Alternatively, the specification information and the maximum step number can be automatically set from a specification described in a defined format. The specification information includes information on an input variable of the program 20 of the software under test.

In step S2, the coverable point extraction unit 120 extracts coverable points included in the program of the software under test in accordance with a coverage criterion to be used and regards the coverable points as uncovered, and the process advances to step S3. If branches are used as the coverage criterion at the time of test execution to measure branch coverage, the coverable point extraction unit 120 extracts branch points. For example, in the case of an if statement, two points for a case where the if statement is judged as TRUE and a case where the if statement is judged as FALSE are extracted as objects to be covered. Note that since step S2 has no dependent relationship with step S3, the sequence of execution can be changed or parallel execution can be performed.

In step S3, the generation control unit 130 sets a variable i to 1 and the process advances to step S4.

In step S4, the generation control unit 130 judges whether a value of the variable i is larger than the maximum step number or whether there is any uncovered coverable point. If the value of the variable i is larger than the maximum step number, since steps subject to test case generation are over, the generation control unit 130 ends the process. Even when the value of the variable i is equal to or less than the maximum step number, if there is no uncovered coverable point, the generation control unit 130 judges that test case generation is unnecessary and ends the process.

Otherwise, the process advances to step S5.

In step S5, the generation control unit 130 confirms whether there is any test case generated from (i−1) steps. If there is any test case, the process advances to step S6. If there is no test case, the process advances to step S17.

In step S6, the non-symbol generation unit 150 joins the test case generated from the (i−1) steps and a test case candidate for an i-th step which is randomly generated on the basis of the specification information read in step S1. The non-symbol generation unit 150 then regards a joined test case as a test case candidate for i steps and the process advances to step S7.

In step S7, the function generation unit 140 generates a test case generation function which receives, as an input, the test case candidate for the i steps generated by the non-symbol generation unit 150 and performs execution for the i steps. The function is a function for executing the program of the software under test for the i steps and executing a next step while retaining an internal state at the end of each step.

In step S8, the non-symbol generation unit 150 receives, as an input, the test case candidate for the i steps generated in step S6 to execute the program of the software under test for the i steps while retaining a state between steps. The non-symbol generation unit 150 then confirms whether any uncovered coverable point is covered. If any uncovered coverable point is covered, the non-symbol generation unit 150 stores, as a test case for the i steps, the test case candidate for the i steps in the memory 920 and the process advances to step S9.

In step S9, the non-symbol generation unit 150 excludes a point (points) which is (are) covered by the test case for the i steps determined in step S8 as a coverable point (coverable points) and the process advances to step S10.

In step S10, the generation control unit 130 judges whether there is any uncovered coverable point. If there is no uncovered coverable point, the generation control unit 130 judges that test case generation is unnecessary and ends the process. Otherwise, the process advances to step S11.

In step S11, the function generation unit 140 acquires the test case generated from the (i−1) steps as inputs to step 1 to step (i−1) in the program of the software under test. The function generation unit 140 then generates a test case generation function for using the test case generated from the (i−1) steps to obtain, by bounded model checking, a test case for the i-th step which covers any uncovered coverable point and the process advances to step S12.

In step S12, the symbol generation unit 160 uses the test case generation function generated in step S11 to execute bounded model checking while retaining a state between steps and attempts to generate a test case for the i-th step, and the process advances to step S13.

In step S13, if a test case is generated in step S12, the symbol generation unit 160 joins the test case generated from the (i−1) steps that is used in step S11 and the test case for the i-th step generated in step S12. The symbol generation unit 160 then stores a joined test case as a test case for the i steps in the memory 920 and the process advances to step S14.

In step S14, the symbol generation unit 160 excludes a point (points) which is (are) covered by the test case generated in step S12 as a coverable point (coverable points) and the process advances to step S15.

In step S15, if any test case for the i steps is stored in the memory 920 in step S8 or step S13, the generation control unit 130 excludes, from the memory 920, the test case for the (i−1) steps used to generate the test case.

In step S16, the generation control unit 130 judges whether there is any uncovered coverable point. If there is no uncovered coverable point, the generation control unit 130 judges that test case generation is unnecessary and ends the process. Otherwise, the process advances to step S17.

In step S17, the non-symbol generation unit 150 randomly generates a test case candidate for the i steps on the basis of the specification information read in step S1 and the process advances to step S18.

In step S18, the function generation unit 140 acquires the test case candidate for the i steps generated by the non-symbol generation unit 150. The function generation unit 140 then generates a test case generation function for executing the program of the software under test for the i steps and executing a next step while retaining an internal state at the end of each step.

In step S19, the non-symbol generation unit 150 acquires the test case candidate for the i steps generated in step S17. The non-symbol generation unit 150 receives, as an input, the test case candidate for the i steps to execute the program of the software under test for the i steps while retaining a state between steps and confirms whether any uncovered coverable point is covered. If any uncovered coverable point is covered, the non-symbol generation unit 150 stores, as a test case for the i steps, the test case candidate for the i steps in the memory 920 and the process advances to step S20.

In step S20, the non-symbol generation unit 150 excludes a point (points) which is (are) covered by the test case for the i steps determined in step S19 as a coverable point (coverable points) and the process advances to step S21.

In step S21, the generation control unit 130 judges whether there is any uncovered coverable point. If there is no uncovered coverable point, the generation control unit 130 judges that test case generation is unnecessary and ends the process.

Otherwise, the process advances to step S22.

In step S22, the function generation unit 140 generates a test case generation function for obtaining, by bounded model checking, a test case for the i steps which covers any uncovered object to be covered in the program of the software under test and the process advances to step S23.

In step S23, the symbol generation unit 160 uses the test case generation function generated in step S22 to execute bounded model checking while retaining a state between steps and attempts to generate the test case for the i steps, and the process advances to step S24.

In step S24, if a test case is generated in step S23, the symbol generation unit 160 stores the test case as a test case for the i steps in the memory 920 and the process advances to step S25.

In step S25, the symbol generation unit 160 excludes a point (points) which is (are) covered by the test case generated in step S23 as a coverable point (coverable points) and the process advances to step S26.

In step S26, the generation control unit 130 increments the variable i by 1 and the process advances to step S4.

In the above-described test case generation process, the processes in step S6 to step S15 are an example of the first generation scheme M1 that, if there is an (i−1)-th test case, uses the (i−1)-th test case to generate an i-th test case.

The processes in step S6 to step S9 are a process of generating the i-th test case by non-symbolic execution. The processes in step S11 to step S15 are a process of generating the i-th test case by symbolic execution which is executed if there is any uncovered point even after the processes in step S6 to step S9.

The processes in step S17 to step S25 are an example of the second generation scheme M2 that, if the (i−1)-th test case is not present, generates the i-th test case by generating respective test cases for step 1 to step i.

The processes in step S17 to step S20 are a process of generating the i-th test case by non-symbolic execution. The processes in step S22 to step S25 are a process of generating the i-th test case by symbolic execution which is executed if there is any uncovered point even after the processes in step S17 to step S20.

A series of processes from step S6 to step S26 is a process in a case where there is any point that is not covered by the i-th test case generated using the (i−1)-th test case by the first generation scheme. Here, the processes from step S17 are a process of generating test cases for all steps by the second generation scheme and generating the i-th test case again.

If there are a plurality of test cases generated from the (i−1) steps, step S7 to step S15 are performed for each of the test cases generated from the (i−1) steps. The sets of steps may be performed in order or in parallel. If a plurality of test cases for the i steps which are generated using the plurality of test cases generated from the (i−1) steps cover only the same coverable point(s), any one of the test cases may be stored as a test case for the i steps in the memory 920.

The non-symbol generation unit 150 may generate a plurality of test case candidates for the i-th step for one test case for the (i−1) steps and regard the plurality of test case candidates for the i-th step as a plurality of test case candidates for the i steps.

The generation control unit 130 may execute step S5 to step S25 after judging in advance at which step each coverable point can be covered. For example, of the coverable points extracted in step S2, coverable points which can be covered by step i are extracted using a different scheme between step S4 and step S5. In step S10, step S16, and step S21, it may be judged whether there is any uncovered point among the coverable points that can be covered by step i.

In the present embodiment, the symbol generation unit 160 attempts to generate a test case using bounded model checking. The symbol generation unit 160, however, may use a different test case generation scheme based on symbolic execution, such as concolic testing.

In the present embodiment, the non-symbol generation unit 150 randomly generates a value as a test case candidate. The non-symbol generation unit 150, however, may be a genetic algorithm or any other test case generation scheme other than symbolic execution, such as machine learning. The generation scheme may be one which uses a value of the test case for the (i−1) steps.

The operation of the test case generation apparatus 100 will next be described using a specific example.

Figure 5:
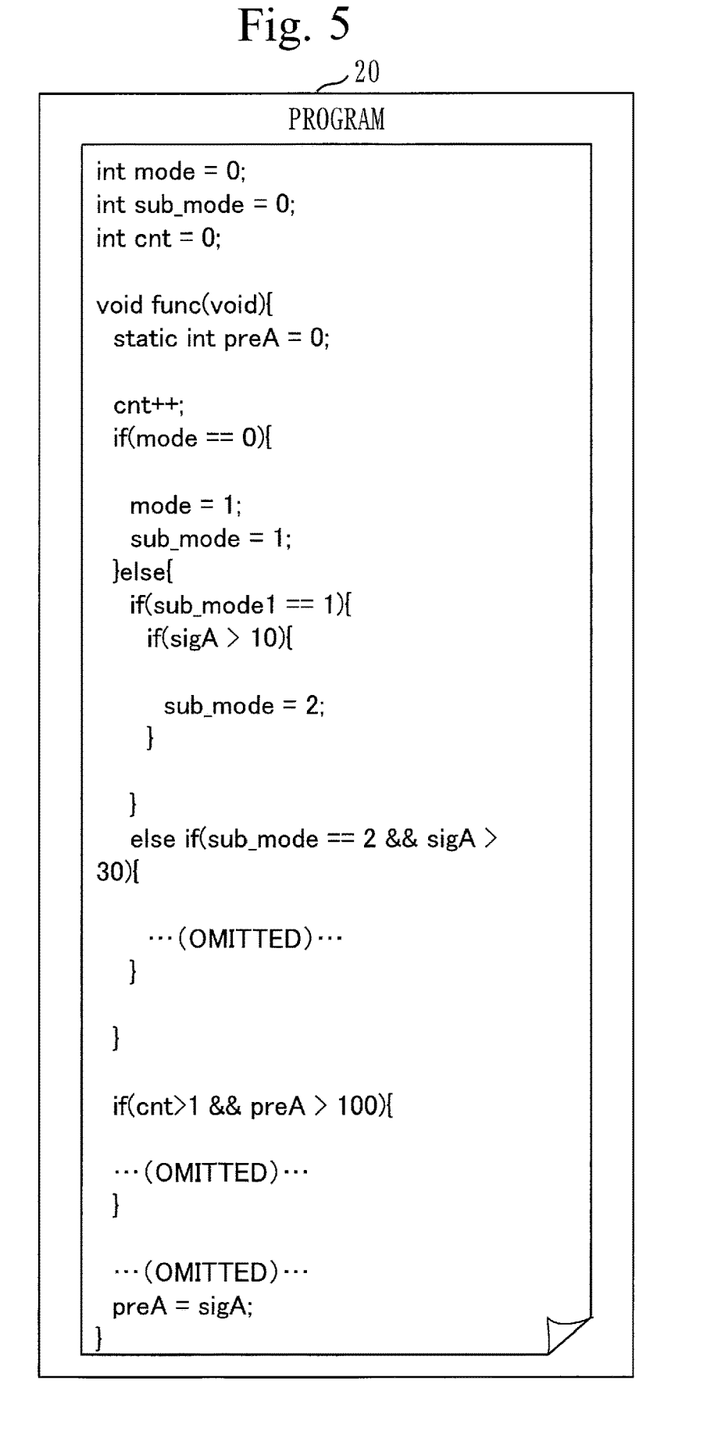
FIG. 5 is a view illustrating a program of software under test according to Embodiment 1.

FIG. 5 is a view illustrating a part of the program 20 of the software under test according to Embodiment 1. In the following example, the part of the program of the software under test illustrated in FIG. 5 is used. Assume that branch coverage is used as a structure coverage criterion at the time of text execution. In the following description, steps in brackets correspond to the steps in FIGS. 2 to 4.

The program acquisition unit 110 reads the program of the software under test, the specification information, and the maximum step number (step S1). Although only the one function func is read in the present example, a plurality of functions or a collection of files may be read. Information on an input variable sigA of the program of the software under test is included in the specification information. The maximum step number is set at 4. The number of input variables depends on a program of software under test and may be two or more.

Figure 6:
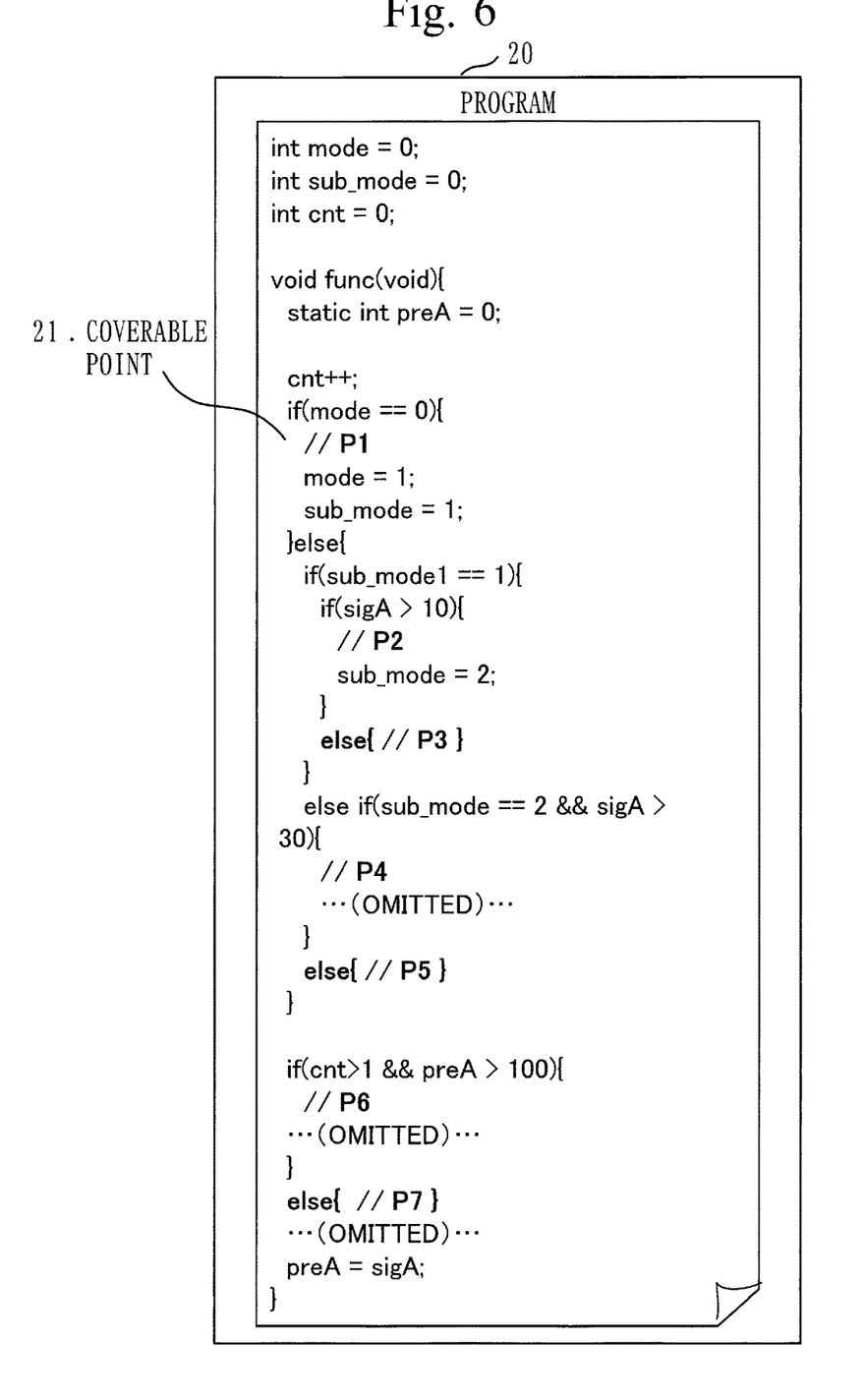
FIG. 6 is a view illustrating coverable points included in the program of the software under test according to Embodiment 1.

When the above-described pieces of information are read, the coverable point extraction unit 120 searches for a TRUE branch and a FALSE branch of each if statement as branch points to be covered in the program of the software under test and extracts a total of 7 points (step S2). The coverable point extraction unit 120 then regards the extracted points as uncovered. FIG. 6 indicates the branch points to be covered in the program illustrated in FIG. 5 with P1 to P7.

The generation control unit 130 sets the variable i to 1 (step S3). Since the value of the variable i is 1 smaller than the maximum step number of 4 and the coverable points P1 to P7 are uncovered, the generation control unit 130 judges that test case generation is necessary (step S4). The generation control unit 130 then confirms whether there is any test case generated in a previous step. Since a first step has no previous step, the generation control unit 130 judges that there is no test case (step S5).

The non-symbol generation unit 150 generates a random value of 50 as a test case candidate for one step for the input variable sigA from the specification information (step S17).

The function generation unit 140 generates a test case generation function which receives, as an input to sigA, the value of 50 as the test case candidate and executes the program of the software under test for the one step (step S18).

The non-symbol generation unit 150 executes the test case generation function and confirms whether any uncovered coverable point is covered (step S19). Since P1 and P7 are covered as a result, the non-symbol generation unit 150 stores 50 as a test case for one step in the memory 920. The covered coverable points P1 and P7 are excluded as coverable points (step S20).

Since P2 to P6 are present as coverable points, the generation control unit 130 advances to a next process (step S21).

The function generation unit 140 generates a test case generation function for obtaining, by bounded model checking, a test case for the one step which covers any uncovered coverable point 21 in the program of the software under test (step S22).

Figure 7:
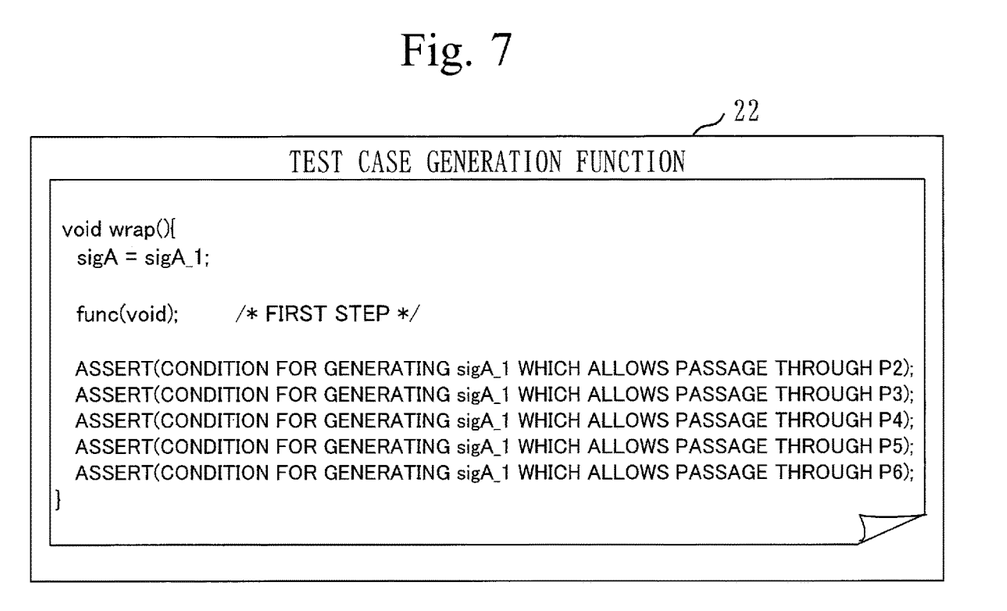
FIG. 7 is a view illustrating a test case generation function for generating a test case for one step, the test case generation function being generated by a function generation unit of the test case generation apparatus according to Embodiment 1.

FIG. 7 is an example of the generated test case generation function 22.

The symbol generation unit 160 uses the function in FIG. 7 to execute bounded model checking and attempts to generate a test case for the one step (step S23). Since there is no coverable point which can be covered by the first step here, a new test case for the one step is not generated (steps S24 and S25).

The generation control unit 130 then advances to a next step where i=2 (step S26). The generation control unit 130 then confirms that the maximum step number is still not reached and that the uncovered branches P2 to P6 are present. For this reason, the generation control unit 130 confirms whether there is any test case generated from the one step. Since 50 is present as a test case generated from the one step here, the generation control unit 130 advances to test case generation using this (step S5).

The non-symbol generation unit 150 randomly generates a value of 50 as a test case candidate for a second step by non-symbolic execution (step S6). The non-symbol generation unit 150 uses the test case for the one step of 50 to set a value for the first step of the input variable sigA to 50 and joins the value of 50 as the test case candidate for the second step to obtain a test case candidate for two steps of (50, 50).

The function generation unit 140 generates a test case generation function which receives, as an input to sigA, the test case candidate of (50, 50) and executes the program of the software under test for the two steps (step S7).

The non-symbol generation unit 150 uses the test case generation function to retain a state at the completion of execution for the one step and execute the second step. In this manner, the non-symbol generation unit 150 performs execution while retaining a state between steps. The non-symbol generation unit 150 then confirms whether the uncovered coverable points P2 to P6 are covered (step S8). Since a value is 50 and the coverable point P2 is covered in the second step as a result, the non-symbol generation unit 150 stores (50, 50) as a test case for the two steps in the memory 920 and excludes P2 as a coverable point (step S9).

Since P3 to P6 are present as coverable points, the generation control unit 130 advances to a next process (step S10).

The function generation unit 140 generates a test case generation function for using the value of 50 of the test case for the one step as a test case for the first step to obtain, by bounded model checking, a test case for the second step which covers any uncovered coverable point (step S11).

Figure 8:
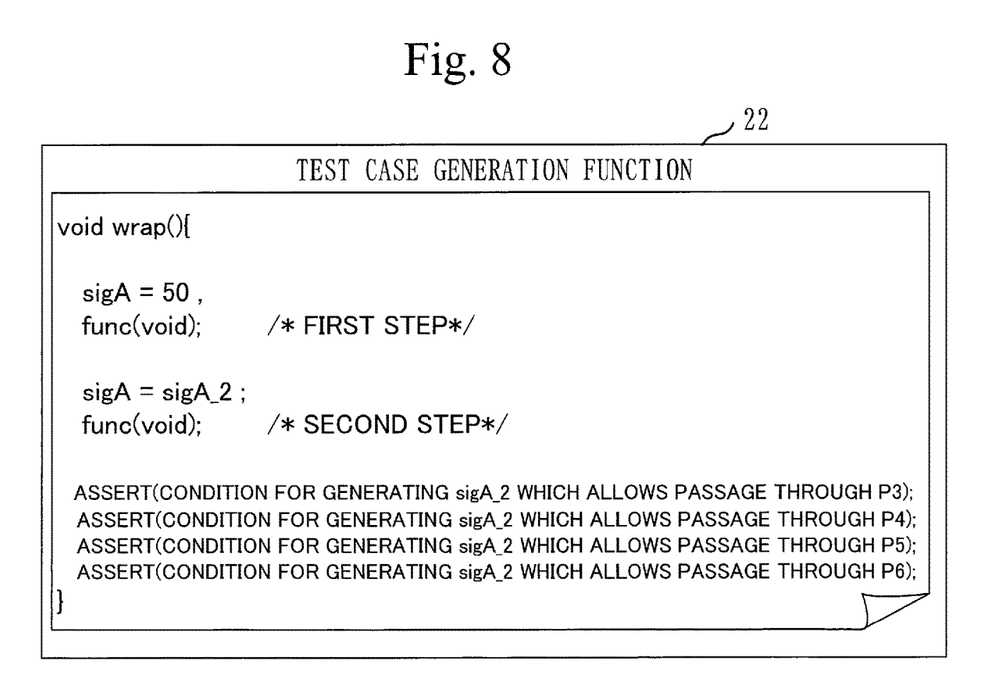
FIG. 8 is a view illustrating a test case generation function for using the test case for the one step to generate a test case for a second step, the test case generation function being generated by the function generation unit of the test case generation apparatus according to Embodiment 1.

FIG. 8 is an example of the generated test case generation function 22.

The symbol generation unit 160 uses the function in FIG. 8 to execute bounded model checking for the two steps while retaining a state in the first step and attempts to generate a test case for the second step (step S12). As a result, a value (for example, 0) less than 10 which covers the coverable point P3 is generated as a test case for the second step, that is, a value of the input variable sigA for the second step. Thus, the symbol generation unit 160 stores (50, 0) as the test case for the two steps in the memory 920 and excludes P3 as a coverable point (steps S13 and S14).

The generation control unit 130 excludes the test case for the one step of 50 used to generate the test case for the two steps from the memory (step S15). As a result, only test cases for the two steps of (50, 50) and (50, 0) are present as test cases in the memory 920. Since the coverable points P4 to P6 are present, the generation control unit 130 then advances to a next process (step S16).

Assume that the non-symbol generation unit 150 generates a random value of (0, 0) as a test case candidate for the two steps (step S17).

The function generation unit 140 generates a test case generation function which receives, as an input to sigA, the test case candidate of (0, 0) and executes the program of the software under test for the two steps (step S18).

The non-symbol generation unit 150 uses the test case generation function to retain a state at the completion of execution for the one step and execute the second step. In this manner, the non-symbol generation unit 150 performs execution while retaining a state between steps (step S19). The non-symbol generation unit 150 confirms whether any uncovered coverable point is covered. In this case, however, no uncovered coverable point is covered, and the test case candidate of (0, 0) is abandoned (steps S20 and S21).

Since the coverable points P4 to P6 are still present, the generation control unit 130 advances to a next process.

The function generation unit 140 generates a test case generation function for obtaining, by bounded model checking, a test case for the two steps which covers any uncovered coverable point (step S22).

Figure 9:
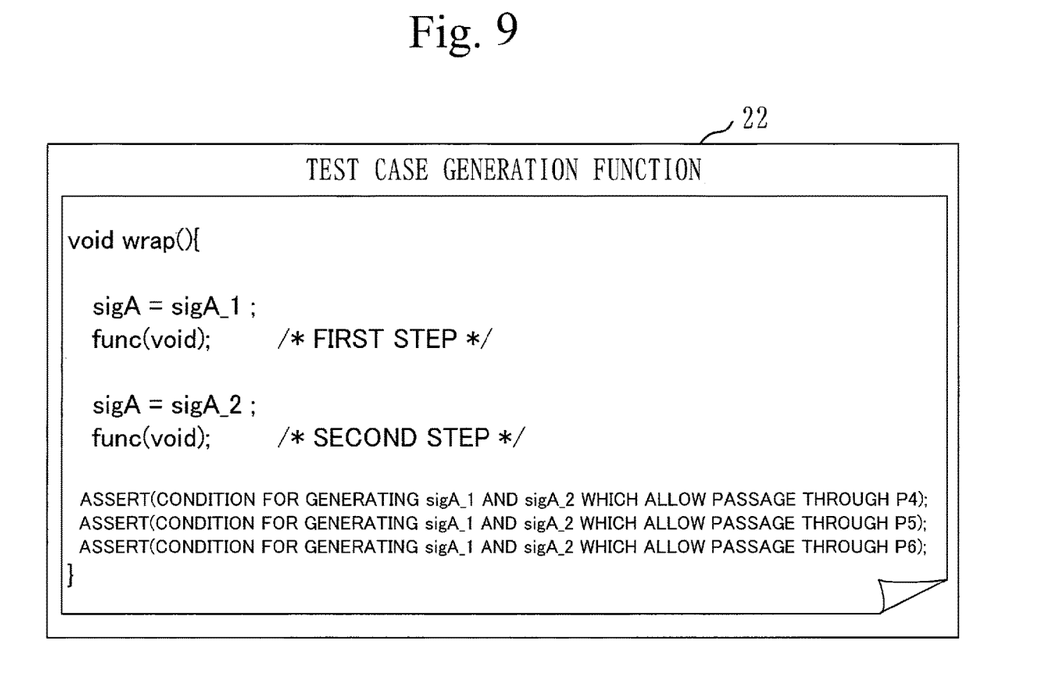
FIG. 9 is a view illustrating a test case generation function for generating a test case for two steps, the test case generation function being generated by the function generation unit of the test case generation apparatus according to Embodiment 1.

FIG. 9 is an example of the generated test case generation function 22.

The symbol generation unit 160 uses the function in FIG. 9 to execute bounded model checking for the two steps while retaining a state in the first step and attempts to generate a test case for the two steps (step S23). As a result, for example, (150, 0) is generated as a test case for the two steps which covers the coverable point P6. Thus, the symbol generation unit 160 stores this in the memory 920 and excludes P6 as a coverable point (steps S24 and S25).

The generation control unit 130 then advances to a next step where i=3 (step S26). The generation control unit 130 then confirms that the maximum step number is still not reached and that the uncovered branches P4 and P5 are present. For this reason, the generation control unit 130 confirms whether there is any test case generated from the two steps. Since (50, 50), (50, 0), and (150, 0) are present as test cases generated from the two steps, the generation control unit 130 advances to test case generation using these (steps S4 and S5).

The non-symbol generation unit 150 uses the test cases for the two steps of (50, 50), (50, 0), and (150, 0) to randomly generate a test case candidate for a third step, as in the case of the second step. The non-symbol generation unit 150 then uses the test case candidate for the third step to generate test case candidates for three steps (step S6). For example, assume that test case candidates are (50, 50, 50), (50, 0, 50), and (150, 0, 50).

The function generation unit 140 generates a test case generation function which receives, as an input to sigA, the test case candidates of (50, 50, 50), (50, 0, 50), and (150, 0, 50) and executes the program of the software under test for the three steps (step S7).

The non-symbol generation unit 150 uses the test case generation function to perform execution while retaining a state between steps (step S8). That is, the non-symbol generation unit 150 retains a state at the completion of execution for the one step and executes the second step, and retains a state at the completion of execution for the two steps and executes the third step. In this manner, the non-symbol generation unit 150 performs execution while retaining a state between steps. The non-symbol generation unit 150 then confirms whether the uncovered coverable points P4 and P5 are covered. As a result, any of the test case candidates can cover the coverable point P4. Here, the non-symbol generation unit 150 stores one of (50, 50, 50) of the test case candidates as a test case for the three steps. The non-symbol generation unit 150 then excludes P4 as an object to be covered (steps S8 and S9).

Since P5 is present as a coverable point, the generation control unit 130 advances to a next process (step S10).

The function generation unit 140 uses a test case for the two steps as test cases for the first step and the second step to generate a test case generation function (step S11). The function generation unit 140 generates a test case generation function for obtaining, by bounded model checking, a test case for the third step which covers the uncovered coverable point P5. Here, test cases for the two steps are (50, 50), (50, 0), and (150, 0).

Figure 10:
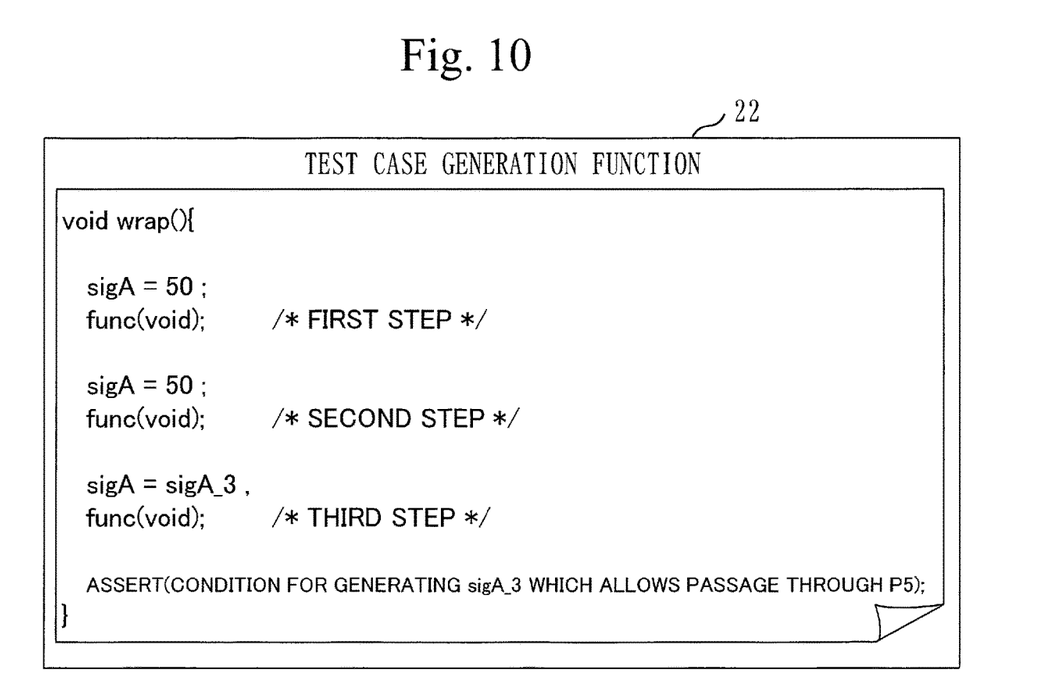
FIG. 10 is a view illustrating a test case generation function for using the test case for the two steps to generate a test case for a third step, the test case generation function being generated by the function generation unit of the test case generation apparatus according to Embodiment 1.

FIG. 10 is an example of the test case generation function 22 that uses the test case for the two steps of (50, 50).

For example, the test case generation function illustrated in FIG. 10 does not perform initialization after execution of the first step and proceeds to call the second step. For this reason, while a global variable or a static variable used by the function func under test after completion of execution of the first step remains unchanged, processing of the function func in the second step proceeds. Thus, the test generation unit 170 that performs symbolic execution, for example, performs analysis of the uninitialized function func in the second step subsequent to analysis of the function func in the first step. This operation is an operation of generating a test case after an internal state is retained.

The symbol generation unit 160 uses the function in FIG. 10 to execute bounded model checking for the three steps while retaining a state in the first step and a state in the second step and attempts to generate a test case for the third step (step S12). As a result, a value (for example, 0) less than 30 which covers the coverable point P5 is generated as the value of the input variable sigA for the third step. Thus, the symbol generation unit 160 stores (50, 50, 0) as a test case for the three steps in the memory 920 and excludes P5 as a coverable point (steps S13, S14, and S15).

Subsequently, the generation control unit 130 excludes the test case for the two steps of (50, 50) used to generate the test case for the three steps from the memory 920. As a result, (50, 0), (150, 0), (50, 50, 50), and (50, 50, 0) are present as test cases in the memory 920. Since there are no more coverable points, the generation control unit 130 judges that test case generation is unnecessary and ends the process (step S16).

As described above, the test case generation apparatus 100 according to the present embodiment analyzes software which executes a process for one step each time a value is input thereto and generates, as a test case, a sequence of values which is input to test the software.

If there is a test case for the (i−1) steps, the generation control unit 130 selects a method which uses the test case for the (i−1) steps to generate a test case. At this time, the generation control unit selects a method which generates a test case for the i-th step after an internal state at the end of the (i−1) steps caused by test case execution is retained. If there is no test case for the (i−1) steps, the generation control unit selects a test case generation method for generating a test case for step 1 to step i.

The function generation unit 140 generates a test case generation function which includes a test case generation condition and a call to the program of the software under test in accordance with the test case generation method selected by the generation control unit.

The test generation unit 170 uses symbolic execution or a combination of symbolic execution and non-symbolic execution and the test case generation function to generate a test case while retaining a state between steps, in accordance with the test case generation method selected by the generation control unit 130. If the test generation unit 170 uses the test case for the (i−1) steps to generate the test case for the i-th step, the test generation unit 170 abandons the used test case for the (i−1) steps.

\*\*\* Description of Advantageous Effects of Present Embodiment \*\*\*

In the test case generation apparatus according to the present embodiment, if generation of a test case spanning a plurality of steps is necessary, test case generation based on non-symbolic execution and test case generation based on symbolic execution are first attempted using a result of test case generation in a previous step. For this reason, the test case generation apparatus according to the present embodiment achieves the following effect just by using a test case generated from the two steps in the third step to perform analysis for one step in a state where an internal state at the end of the second step is retained. That is, it is possible to cover respective coverable points by test case generation based on non-symbolic execution and test case generation based on symbolic execution and end test case generation. In the above-described specific example, the internal state at the end of the second step is one where mode=1 and sub_mode=2. That is, just analysis for one step in a state where mode of 1 and sub_mode of 2 are retained makes it possible to cover respective coverable points by test case generation based on non-symbolic execution and test case generation based on symbolic execution and end test case generation.

Note that, if the schemes according to the present embodiment are not used, test case generation needs to be attempted for all paths of the three steps. For this reason, in test case generation based on non-symbolic execution, the number of test case candidates is enormous, and generation takes time. In test case generation based on symbolic execution, it takes time for analysis of paths for the three steps and extraction of values which satisfy them.

In the test case generation apparatus according to the present embodiment, when i=2, after test case generation is performed using a result of test case generation for the one step, the uncovered coverable point P6 is left though the coverable point P6 can actually be covered in the second step. The test case generation apparatus according to the present embodiment can generate a test case which can cover P6 by performing test case generation based on symbolic execution spanning step 1 to step 2 for this. As described above, a combination of a scheme which generates a test case for the i steps using a test case for the (i−1) steps and a scheme which generates a test case spanning all the i steps makes it possible to reliably generate a test case covering points which can be covered by step i.

The test case generation apparatus according to the present embodiment uses a test case for the one step to generate a test case, confirms that the test case covers any object to be covered, and stores the test case as a test case for the two steps in the memory 920, when i=2. When the test case generation apparatus stores the test case in the memory 920, the test case generation apparatus deletes the used test case for the one step. It is thus possible to delete a redundant test case which embraces objects to be covered and reduce the total number of test cases, and reduce the number of test man-hours, such as examination of an expected output value and a test execution time period.

* Other Configuration *

<Modification 1>

In the present embodiment, the capabilities of the program acquisition unit 110, the coverable point extraction unit 120, the generation control unit 130, the function generation unit 140, the non-symbol generation unit 150, and the symbol generation unit 160 are implemented by software. As a modification, the capabilities of the program acquisition unit 110, the coverable point extraction unit 120, the generation control unit 130, the function generation unit 140, the non-symbol generation unit 150, and the symbol generation unit 160 may be implemented by hardware.

Figure 11:
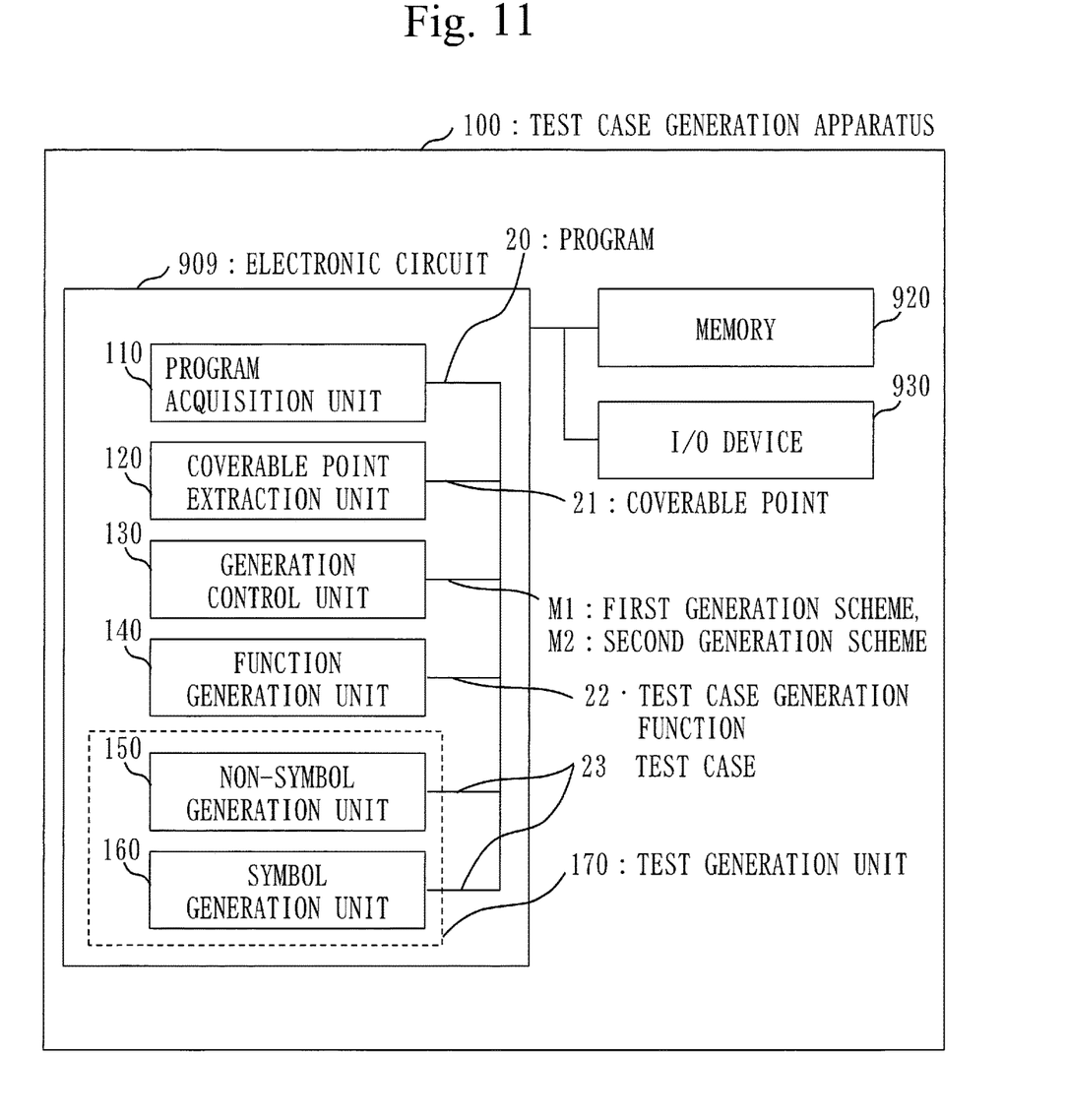
FIG. 11 is a block diagram illustrating a configuration of a test case generation apparatus according to a modification of Embodiment 1.

FIG. 11 is a configuration diagram of the test case generation apparatus 100 according to a modification of the present embodiment.

The test case generation apparatus 100 includes pieces of hardware, such as an electronic circuit 909, the memory 920, and the I/O device 930.

The electronic circuit 909 is a dedicated electronic circuit which implements the capabilities of the program acquisition unit 110, the coverable point extraction unit 120, the generation control unit 130, the function generation unit 140, the non-symbol generation unit 150, and the symbol generation unit 160.

Specifically, the electronic circuit 909 is a single circuit, a composite circuit, a programmed processor, a parallel-programmed processor, a logic IC, a GA, an ASIC, or an FPGA. GA stands for Gate Array. ASIC stands for Application Specific Integrated Circuit. FPGA stands for Field-Programmable Gate Array.

The capabilities of the program acquisition unit 110, the coverable point extraction unit 120, the generation control unit 130, the function generation unit 140, the non-symbol generation unit 150, and the symbol generation unit 160 may be implemented by one electronic circuit or may be distributed to and implemented by a plurality of electronic circuits.

As another modification, some of the capabilities of the program acquisition unit 110, the coverable point extraction unit 120, the generation control unit 130, the function generation unit 140, the non-symbol generation unit 150, and the symbol generation unit 160 may be implemented by an electronic circuit, and the other capabilities may be implemented by software.

As another modification, some or all of the capabilities of the program acquisition unit 110, the coverable point extraction unit 120, the generation control unit 130, the function generation unit 140, the non-symbol generation unit 150, and the symbol generation unit 160 may be implemented by firmware.

Each of a processor and an electronic circuit is also called processing circuitry. That is, in the test case generation apparatus 100, the capabilities of the program acquisition unit 110, the coverable point extraction unit 120, the generation control unit 130, the function generation unit 140, the non-symbol generation unit 150, and the symbol generation unit 160 are implemented by processing circuitry.

Embodiment 1 above has described, as independent functional blocks, units of a test case generation apparatus. A configuration of the test case generation apparatus, however, may not be like that of the above-described embodiment. Functional blocks of the test case generation apparatus may be configured in any manner as long as the capabilities described in the embodiment can be implemented. The test case generation apparatus may be a system which is composed not of one apparatus but of a plurality of apparatuses.

A plurality of portions of Embodiment 1 may be combined and carried out. Alternatively, one portion of the embodiment may be carried out. Additionally, the embodiment may be combined and carried out in any manner, in whole or in part.

That is, as for Embodiment 1, the embodiments can be freely combined, any constituent element in each embodiment can be modified, or any constituent element can be omitted in each embodiment.

Note that the embodiment described above is merely a preferred example in nature and is not intended to limit the scope of the present invention, the scope of applications of the present invention, and the scope of use of the present invention. Various changes can be made to the embodiment as needed.

REFERENCE SIGNS LIST

20: program; 21: coverable point; 22: test case generation function; 23: test case; 100: test case generation apparatus; 110: program acquisition unit; 120: coverable point extraction unit; 130: generation control unit; 140: function generation unit; 150: non-symbol generation unit; 160: symbol generation unit; 170: test generation unit; 909: electronic circuit; 910: processor; 920: memory; 930: I/O device; M1: first generation scheme; M2: second generation scheme

The invention claimed is:

1. A test case generation apparatus which generates a test case, the test case being input to a program which executes a process for one step each time a value is input and being composed of a test case input number of values which are input to respective processes for i steps to be sequentially executed, the test case generation apparatus comprising:
   a memory to store data; and
   processing circuitry
      to, if an (i−1)-th test case which is a test case for step 1 to step (i−1) is stored in the memory, select a first generation scheme which uses the (i−1)-th test case to generate an i-th test case which is a test case for step 1 to step i, and
      to generate a test case for executing an i-th step in a state where an internal state at an end of the (i−1) steps caused by execution for the (i−1)-th test case is retained, to generate the i-th test case by joining the (i−1)-th test case and the test case for the i-th step, and to store the i-th test case in the memory, in accordance with the first generation scheme, wherein
      i is an integer equal to or more than 2.

2. The test case generation apparatus according to claim 1,
   wherein the processing circuitry
   extracts a coverable point which is to be covered by a test from source code of the program,
   generates a test case generation function which includes a test case generation condition and a call to the program such that the i-th test case covers an uncovered point which is a coverable point not covered by an (i−1)-th test case, and
   uses the test case generation function to generate the i-th test case.

3. The test case generation apparatus according to claim 2, wherein
   the processing circuitry
   selects a second generation scheme which generates respective test cases for step 1 to step i if the (i−1)-th test case is not stored in the memory,
   generates a test case generation function which generates respective test cases for a first step to the i-th step in the state where the internal state at the end of the (i−1) steps caused by execution for the (i−1)-th test case is retained, in accordance with the second generation scheme, and
   uses the test case generation function to generate the respective test cases for the first step to the i-th step, generates the i-th test case by joining the test cases for the first step to the i-th step, and stores the i-th test case in the memory.

4. The test case generation apparatus according to claim 3, wherein
   the processing circuitry generates a test case by non-symbolic execution and a test case by symbolic execution, generates the i-th test case if the first generation scheme is selected, judges, through execution of a test using the generated i-th test case, whether the uncovered point is present, and generates the i-th test case such that at least a part of the uncovered point is covered and stores the generated i-th test case in the memory if the uncovered point is present.

5. The test case generation apparatus according to claim 1, wherein
   the processing circuitry abandons the used (i−1)-th test case if the i-th test case is generated using the (i−1)-th test case in accordance with the first generation scheme.

6. The test case generation apparatus according to claim 2, wherein
   the processing circuitry abandons the used (i−1)-th test case if the i-th test case is generated using the (i−1)-th test case in accordance with the first generation scheme.

7. The test case generation apparatus according to claim 3, wherein
   the processing circuitry abandons the used (i−1)-th test case if the i-th test case is generated using the (i−1)-th test case in accordance with the first generation scheme.

8. The test case generation apparatus according to claim 4, wherein
   the processing circuitry abandons the used (i−1)-th test case if the i-th test case is generated using the (i−1)-th test case in accordance with the first generation scheme.

9. A test case generation method for a test case generation apparatus which generates a test case, the test case being input to a program which executes a process for one step each time a value is input and being composed of a test case input number of values which are input to respective processes for i steps to be sequentially executed, the test case generation apparatus including a memory to store data, the test case generation method comprising:
   selecting, if an (i−1)-th test case which is a test case for step 1 to step (i−1) is stored in the memory, a first generation scheme which uses the (i−1)-th test case to generate an i-th test case which is a test case for step 1 to step i, and
   generating a test case for executing an i-th step in a state where an internal state at an end of the (i−1) steps caused by execution for the (i−1)-th test case is retained, generating the i-th test case by joining the (i−1)-th test case and the test case for the i-th step, and storing the i-th test case in the memory, in accordance with the first generation scheme, wherein
   i is an integer equal to or more than 2.

10. A non-transitory computer readable medium storing a test case generation program for a test case generation apparatus which generates a test case, the test case being input to a program which executes a process for one step each time a value is input and being composed of a test case input number of values which are input to respective processes for i steps to be sequentially executed, the test case generation apparatus including a memory to store data, the test case generation program causing the test case generation apparatus which is a computer to execute:
   a generation control process of, if an (i−1)-th test case which is a test case for step 1 to step (i−1) is stored in the memory, selecting a first generation scheme which uses the (i−1)-th test case to generate an i-th test case which is a test case for step 1 to step i, and
   a test generation process of generating a test case for executing an i-th step in a state where an internal state at an end of the (i−1) steps caused by execution for the (i−1)-th test case is retained, generating the i-th test case by joining the (i−1)-th test case and the test case for the i-th step, and storing the i-th test case in the memory, in accordance with the first generation scheme, wherein
   i is an integer equal to or more than 2.

* * * * *